United States Patent
Weman

[15] 3,698,048
[45] Oct. 17, 1972

[54] FASTENING FOR THE LOOP OF A THREE-POINT SAFETY BELT IN MOTOR VEHICLES

[72] Inventor: Per Olaf Weman, Stockholm, Sweden

[73] Assignee: Sigmatex Ag, Basel, Switzerland

[22] Filed: Nov. 26, 1969

[21] Appl. No.: 880,196

[30] Foreign Application Priority Data

Dec. 2, 1968  Germany..........P 18 12 115.8

[52] U.S. Cl.................24/241 P, 24/241 PP, 297/285
[51] Int. Cl. .........................A44b 13/00, A47c 3/00
[58] Field of Search......................24/241–242, 232; 297/233–235, 285, 288, 284

[56] References Cited

UNITED STATES PATENTS

| | | | |
|---|---|---|---|
| 688,006 | 12/1901 | Rickman | 24/241 PS |
| 1,233,376 | 7/1917 | Link | 24/241 PS |
| 2,904,347 | 12/1971 | Tucker | 297/385 X |
| 992,759 | 5/1911 | Denison | 24/241 PP |
| 1,002,852 | 9/1911 | Lane | 24/241 PS |

FOREIGN PATENTS OR APPLICATIONS 461,662  2/1951  Italy ......................24/241 PS

*Primary Examiner*—Paul R. Gilliam
*Attorney*—Markva, Smith & Kruger

[57] ABSTRACT

A fastening for holding the loop of a three-point safety belt in motor vehicles comprises a rigid bracket secured to the vehicle floor and carrying a clasp formed with an arm of which the underside defines a slot extending lengthwise of the vehicle for the insertion thereinto of the loop, the open end of said slot which faces the back of the vehicle being closed by a catch which is openable by the belt itself when this is pushed into the slot from the back.

8 Claims, 2 Drawing Figures

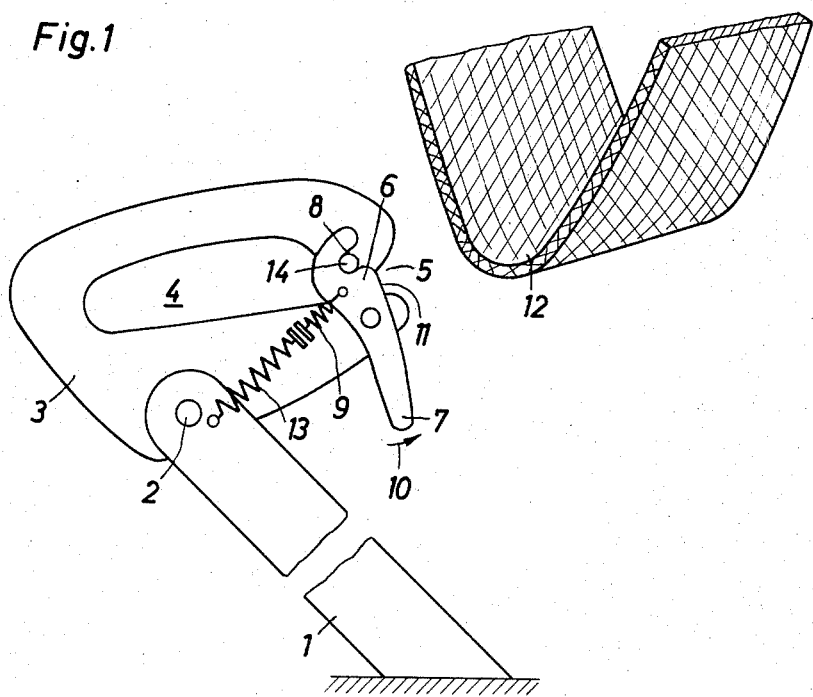
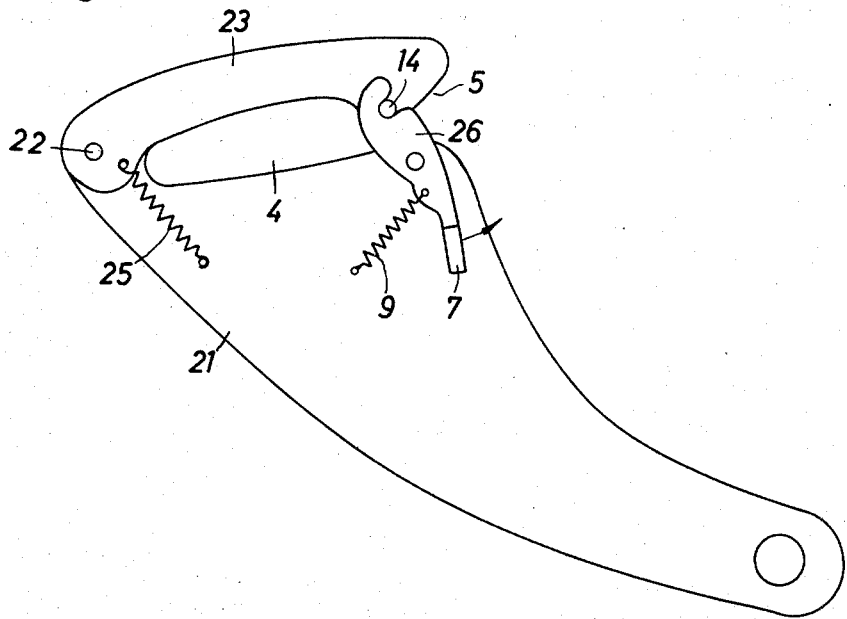

3,698,048

FASTENING FOR THE LOOP OF A THREE-POINT SAFETY BELT IN MOTOR VEHICLES

BACKGROUND OF THE INVENTION

This invention relates to a fastening for the loop of a three-point safety belt in motor vehicles, comprising a bracket rigidly affixed to the vehicle floor and carrying a clasp of which the bottom edge defines a slot extending lengthwise of the vehicle for the reception therein of the loop.

For holding the driver or passengers in a motor vehicle during an accident it has been found that under certain conditions it is desirable to interconnect the waist belt and the shoulder belt of a three-point safety belt by a running loop permitting the tension in the two portions of the belt to equalize. Such belts can be conveniently fitted by using a fastening into which the loop which connects the waist belt to the shoulder belt need merely be inserted.

A conventional fastening of such a kind comprises a lock attached to the vehicle floor by a looped strap and provided with a pivoted clasp. After having been opened for the insertion of the loop the clasp can be closed in which position it is then held by a spring-loaded catch. This well known type of fastening is inconvenient because it cannot be manipulated with only one hand. Partly this is due to the fastening not being rigidly connected to the vehicle floor so that it must be picked up and held with one hand whilst the loop is inserted with the other. It is practically impossible for the driver of the vehicle to do this whilst the vehicle is in motion, and if he omits to fasten the belt immediately after having taken his seat the probabilities are that he will refrain from doing so until he is forced to stop the vehicle for some other reason. However, the provision of a fixed bracket instead of an anchoring strap is not in itself sufficient to solve the difficulty because in normal fastenings the clasp is not normally open. It must first be released by undoing the locking catch. The clasp then falls downwards. In order to permit the loop of the belt to be inserted, the clasp must therefore be held in raised position. Again this is difficult to do with one hand without looking, and the driver of a vehicle cannot do it whilst the vehicle is in motion.

For overcoming the difficulty a fastening has been proposed in which the frame of the lock carrying the clasp and the catch is connected to the floor by a rigid bracket and the clasp is urged by a spring into open position. However, even these types of fastenings are not entirely satisfactory, because the insertion of the belt then calls for additional manipulations. The catch must first be lifted into open position with one finger of the hand holding the loop. The loop must then be inserted into the slot obliquely from above. Finally the catch must be returned into locking position. During this latter operation the loop must still be held in the slot to prevent it from pulling out. The manipulation of such a fastening by a driver whilst driving a vehicle calls for a degree of skill and concentration likely to detract him from watching what is happening on the road.

SUMMARY OF THE INVENTION

It is the object of the present invention to provide a fastening for the loop of a safety belt which permits the loop to be fastened with one hand without looking whilst the vehicle is in motion.

To attain this object the present invention provides a fastening for holding the loop of a three-point safety belt in motor vehicles, comprising a rigid bracket secured to the vehicle floor; a clasp carried by said bracket and provided with an arm of which the underside defines a slot having an open end facing the back of the vehicle and extending lengthwise of the vehicle for the insertion thereinto of a loop of a three-point safety belt, and a catch arranged for closing the open end of said slot and openable by the belt itself when this is pushed into the slot from the back.

In practice this arrangement eliminates the necessity of the driver first having to raise the catch with one finger of the hand he is using for holding the loop and then having to manipulate another activating member in order to lock the slot. He need merely hold the loop itself and push it forward into the slot. Insertion of the loop into the slot under the clasp may be assisted by providing the opening with a flared mouth for guiding the loop under the clasp.

The catch may be pivotably mounted in such a way that it will automatically close by gravity when the loop has been fully inserted, but that it can be deliberately reopened when required. However, in a preferred arrangement the catch may be spring-loaded in conventional manner in the direction for keeping the catch in locking position. Naturally the spring is preferably weak to reduce the resistance offered by the catch to the insertion of the loop. Moreover, the catch may be provided with a finger rest for facilitating the release of the catch when the belt is to be unfastened.

The clasp may likewise be hingeably or pivotably attached to the bracket and loaded by a second spring pulling the clasp into locking position from which it is deflectable against the pressure or pull of the spring into a position in which the belt can be easily detached, or the spring may urge the clasp into a position in which the release of the belt is convenient.

In an alternative embodiment the clasp together with the catch and hence the slot under the clasp may be deflectable on the bracket against the thrust of a spring. This arrangement has the advantage that when the wearer of the belt is thrown forward in an accident the belt will not be pulled tightly into the forward end of the slot where it may fray and be torn, but that owing to the tilt of the clasp the full width of the loop will remain under the clasp.

BRIEF DESCRIPTION OF THE DRAWING

Two embodiments of the invention will now be described by way of example and with reference to the accompanying drawing, in which:

FIG. 1 is a side elevation of a clasp and a catch according to the invention which jointly pivot on a bracket, and FIG. 2 is a similar view of a bracket on which the clasp and the catch are separately pivotably mounted.

DESCRIPTION OF THE PREFERRED EMBODIMENTS

Referring to FIG. 1, a bracket 1 is rigidly affixed to the floor of a vehicle. A clasp 3 is pivotally mounted on the end of the bracket at a fulcrum 2. This clasp has a substantially U-shaped configuration, the upper arm embracing a slot 4 which is open at the rear end of the clasp, the opening being formed with a widening entry portion 5. The clasp 3 is so disposed that the opening faces the back of the vehicle.

The bottom part of the clasp 3 carries a catch 6 provided with a finger rest 7 for manually operating the catch and at its forward end with a hook 8. In the drawing the catch is in locking position, its hook 8 engaging a pin 14 on the upper arm of the clasp 3 above the slot. The catch is held in locking position by a tension spring 9. By pushing the finger rest 7 in the direction indicated by an arrow 10, the catch 6 can be easily released. The catch can also be opened by thrust applied to its edge at 11. The catch will open in this way when the loop 12 of the belt is inserted into the clasp through the opening into the slot 4. The three-point safety belt can therefore be secured simply by pushing the loop 12 from the rear end of the clasp 3 through the slot 4. If in an accident the person wearing the belt is thrown forward and thus applies major strain to the belt, the loop 12 will not slide into the front end corner of the slot 4, since the clasp 3 will pivot about its fulcrum 2 against the resistance of a second spring 13 and the full width of the loop will continue to embrace the upper arm of the clasp.

The embodiment illustrated in FIG. 2 differs from the above described form of construction substantially only in that an upper arm 23 is pivotably attached to a bracket 21 at a point 22. The arm 23 is loaded by a spring 25 which may be a compression or a tension spring. If it is a tension spring the arm can be raised against the resistance of the spring for releasing the belt, whereas a compression spring will cause the arm to spring open automatically when a catch 26 is released.

The invention may be embodied in other specific forms without departing from the spirit or essential characteristics thereof. The present embodiments are therefore to be considered in all respects as illustrative and not restrictive.

What is claimed is:

1. A fastening assembly for holding a loop in a belt comprising:
   a. bracket means for providing rigid support to the assembly,
   b. clasp means pivotally mounted on said bracket means and including a slot having a structural configuration to receive the entire width of the belt,
   c. means connected to said bracket means and to said clasp means for biasing said clasp means to a predetermined position,
   d. said slot being open at one end thereof to permit entrance of the belt into the structural configuration of the slot,
   e. catch means pivotally mounted adjacent the open end of the slot and adapted movement to an open position by insertion of the belt into the slot, and
   f. means operably associated with the catch and clasp means for automatically moving the catch means to a closed position after insertion of the belt into the slot.

2. A fastening assembly as described in claim 1, wherein said means operably associated with the catch means includes a spring means for biasing the catch into the closed position.

3. A fastening assembly as described in claim 1, wherein the catch means has a release means adapted for moving said catch means to an open position and removing said belt in a one hand operation.

4. A fastening assembly as described in claim 3, wherein the release means has a lever for moving said catch means into the open position.

5. A fastening assembly as described in claim 1, wherein the clasp means is composed of a substantially U-shaped member which includes two parallel arms of generally equal length which define said slot.

6. A fastening assembly as described in claim 5, wherein
   the catch means is pivotally mounted on one arm of the clasp and biased by a spring means into a closed position; and
   the opposite arm includes a retaining means upon which the catch engages and prevents the pivotal movement of said catch past the closed position.

7. A fastening assembly as described in claim 5, wherein
   said arms are spread at their open-end to provide a guide for entrance of said belt.

8. A fastening assembly as described in claim 1, wherein
   the bracket means includes a rigid bracket member secured to a motor vehicle,
   the clasp means is composed of a substantially U-shaped member which includes two parallel arms of generally equal length which define said slot for inserting thereinto a loop of a three-point safety belt, and
   said clasp means attached to said bracket along a portion of one arm so that the arms extend generally lengthwise of the vehicle and the open end of the slot faces the rear of the vehicle.

* * * * *